United States Patent [19]

Rubenstein

[11] 4,029,414

[45] June 14, 1977

[54] METHOD AND DEVICE FOR RECORDING COPIER USAGE DATA

[75] Inventor: Robert Aron Rubenstein, Mayfield Heights, Ohio

[73] Assignee: Addressograph Multigraph Corporation, Cleveland, Ohio

[22] Filed: June 30, 1975

[21] Appl. No.: 591,338

[52] U.S. Cl. .................................. 355/112; 355/40

[51] Int. Cl.² .......................................... G03B 27/14

[58] Field of Search .............. 355/112, 133, 11, 14, 355/77, 66, 18, 40

[56] References Cited

UNITED STATES PATENTS

| | | | |
|---|---|---|---|
| 1,223,686 | 4/1917 | Frisch | 346/107 MP |
| 2,018,015 | 10/1935 | Fahrney | 346/107 MP |
| 2,232,829 | 2/1941 | Ross | 346/107 MP |
| 3,427,441 | 2/1969 | Swords | 355/14 X |
| 3,472,136 | 10/1969 | Hemphill | 355/40 |
| 3,734,610 | 5/1973 | O'Connell et al. | 355/40 |

*Primary Examiner*—R. L. Moses
*Attorney, Agent, or Firm*—Harry M. Fleck, Jr.

[57] ABSTRACT

A method and device for recording data related to usage of a copier machine, or the like, is provided. The device includes means for producing data related to the apparatus usage and means for presenting an image of the data to the exposure plane of the apparatus whereby operation of the machine produces a record of the data on copy material.

7 Claims, 4 Drawing Figures

METHOD AND DEVICE FOR RECORDING COPIER USAGE DATA

BACKGROUND OF THE INVENTION

The present invention is generally related to copy machines and, more particularly, to a method and device for recording data representative of the usage of a copy machine.

In recent years, the leasing or rental of copiers and the like has increased significantly. It has become common to base rental rates either totally or partially upon the amount of the usage of the machine. Most often, the rates are determined by the number of copies made in a predetermined time usually corresponding to the billing period. The rates may also vary as a function of the types of copies made. For example, ten copies of a single original may cost less per copy than ten copies of ten different originals. Counting devices or the like are usually provided with each machine for recording the number of copies which have been made. The user or service man reads the counter periodically and forwards such information to the leasing company for billing purposes.

Such an arrangement is an inconvenience to the person responsible for recording the information. Also, errors may occur in writing down the counter readings. In addition, the user may intentionally record an incorrect figure in an effort to reduce the amount of billing or defer full payment until the next billing period. Another shortcoming of this arrangement is the cost of processing the handwritten data for billing purposes. Considerable time and expense is entailed by the leasing company in making calculations based upon the handwritten data and typing or printing each customer bill. With the advent of optical character recognition (OCR) equipment and the like, the cost of billing customers can be significantly reduced if the input data is of a quality suitable for scanning by OCR equipment. Thus, there is a need for an arrangement which will eliminate errors in recording the copier usage data and at the same time provide such data in a form which is more suitable for processing through the use of optical character recognition equipment or the like.

SUMMARY OF THE INVENTION

It is an object of the present invention to provide a novel means for recording copier usage data quickly and conveniently and in a manner which significantly reduces the likelihood of error or fraud.

Another object of the present invention is to provide a unique means for producing copier usage date in a form suitable for scanning with OCR equipment or the like, whereby billing costs may be significantly reduced.

It is a further object of the present invention to provide a versatile method for recording copier usage data by producing a copy of the counter indicia through operation of the copier machine.

As still another object of the present invention is to provide a novel copier usage data recorder comprising a counter or the like mounted adjacent the document illumination station with means for selectively presenting the counter indicia to the station whereby operation of the copier produces a copy of the indicia.

Another object of the present invention is to provide a versatile copier usage data recorder which is of relatively simple construction and inexpensive to manufacture and maintain.

DESCRIPTION OF THE PREFERRED EMBODIMENT

Figure 1:
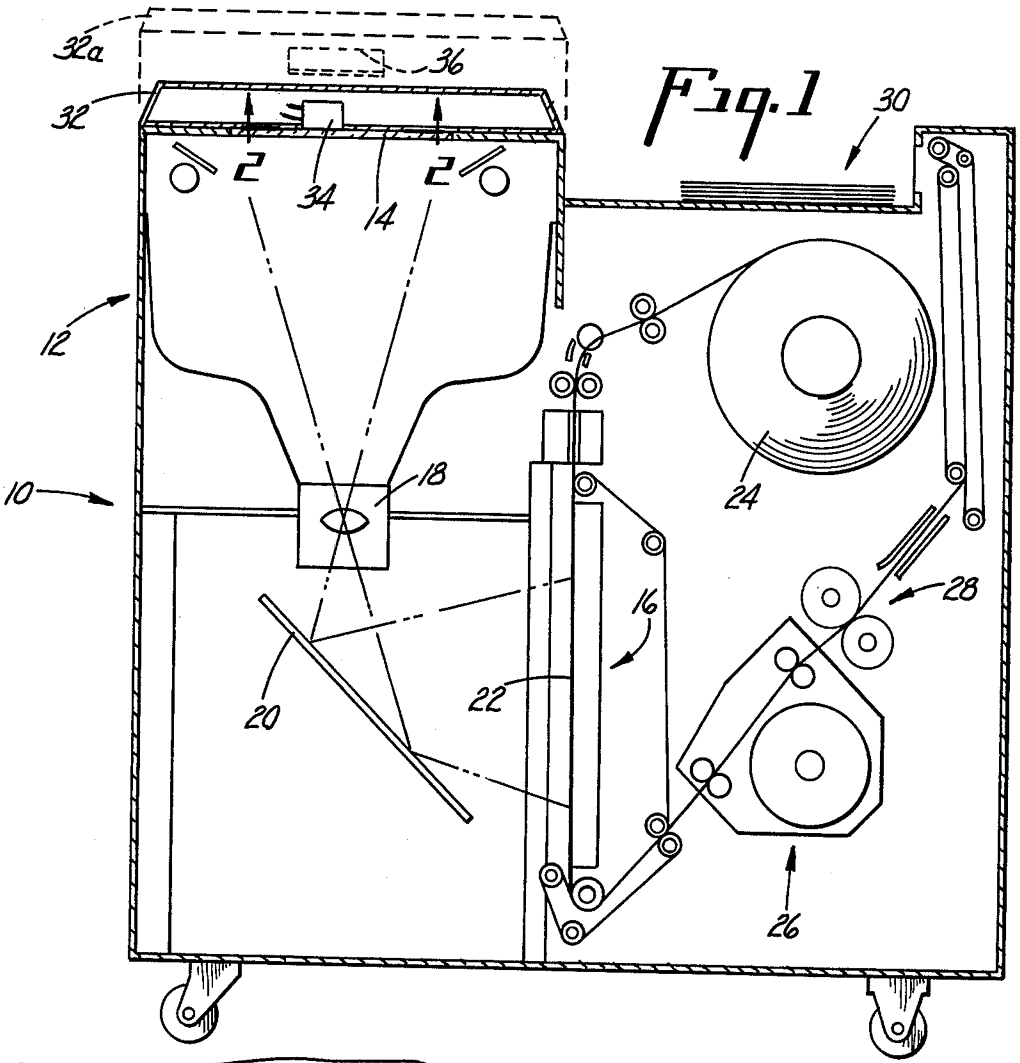
FIG. 1 is a simplified cross-sectional view of a typical photographic reproduction apparatus associated with the present invention.

Referring now, more particularly, to FIG. 1 of the drawings, a typical photographic reproduction apparatus is generally indicated by the numeral 10 and includes an illumination or imaging station 12 for irradiating documents positioned on a transparent platen 14 to provide an image of the document to an exposure station generally indicated by the numeral 16. The apparatus is further provided with an optical system including appropriate lenses 18 and a reflecting mirror 20 which together provide a focused image of the document from an object plane defined by a platen 14 to an image plane 22 at exposure station 16.

The apparatus illustrated in FIG. 1 is described in detail in U.S. Pat. No. 3,663,102 , dated May 16, 1972, and assigned to the assignee of thepresent invention. Briefly, this apparatus includes a roll of photosensitive paper 24 which is advanced by appropriate means, not illustrated in detail, to station 16 where it is exposed with an image of a document at the object plane of illumination station 12. The exposed paper is then advanced to a developing station 26 where the latent image is developed by means well known to those skilled in the art. A fusing station 28 fixed the developed image to the paper and the copy material is delivered to an output station 30.

The reproduction apparatus is further provided with a radiation shielding means defined by a lid or cover 32 which is movable to an open position illustrated in phantom at 32a. Documents are presented to the illumination station by opening lid 32 and positioning the document in face-down orientation on platen 14. The lid is then closed before the apparatus is operated, whereby radiation from the illumination station is generally confined to the document.

The present invention includes a counter 34, or other display device, which is carried by lid 32 and positioned to present an image of data relating to the usage of the apparatus to the object plane, whereby a copy of the data may be produced through operation of the apparatus as hereinafter described. Preferably, counter 34 is a standard, commercially available electro-mechanical counter which is advanced by appropriate electrical signals provided from the reproduction apparatus. Various types of circuitry or programs which are well known may be provided to advance the counter in the desired manner. Such may take into consideration various modes of machine operation, such as multiple copy or single copy operation, or may produce an output representative of the actual billing amount. If desired, a visual display device, such as a light emitting diode (LED) display, may be substituted for an electro-mechanical counter. With such an arrangement, appropriate data storage means and display control circuitry would be provided to energize the proper LED segments. These display devices are well known to those skilled in the art, and it is not intended that such devices per se constitute a part of the present invention.

Figure 2:
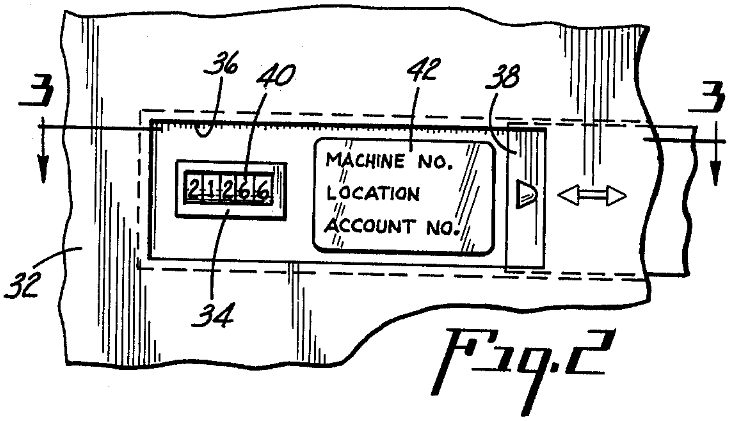
FIG. 2 is a partial sectional view taken along Section 2—'of FIG. 1.
Figure 3:
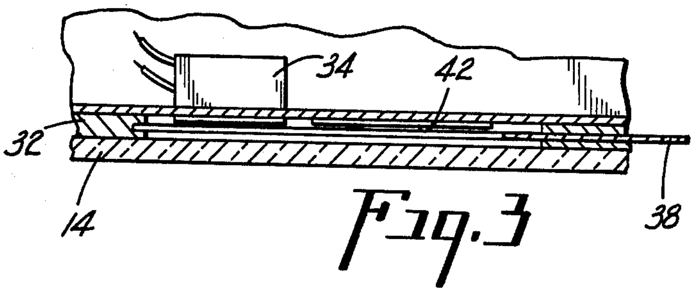
FIG. 3 is a sectional view taken along Section 3—'of FIG. 2.

Referring now, more particularly, to FIGS. 2 and 3 of the drawings, the present invention may be understood in more detail. Shielding lid 32 is provided with an opening or a window 36 in general alignment with counter 34. A door or closure member 38 is slidably mounted in lid 32 for selective movement between open and closed positions. With the closure member 38 in the open position as illustrated in FIG. 2, the indicia 40 of counter 34 may be presented to the apparatus for copying. During normal operation of the machine to produce document copies, closure member 38 is in a closed position, whereby the counter data will not be copied. If desired, window 36 may be of sufficient size to accommodate a machine identification data member 42 which is copied together with the machine usage data. In order that the image of the usage data be properly focused at the image point of the exposure station, it is necessary that the indicia members of counter 34 be positioned close to the object plane of platen 14, so as to be within acceptable tolerances of the optical system of the copy machine. Thus, it is desirable that the thickness of closure member 38 be held to a minimum. If necessary, appropriate mounting may be provided for counter 34 to lower such onto platen 14 for sharp focusing.

In order to obtain a copy of the machine usage data for billing purposes or otherwise, it is necessary for the operator to open closure member 38, place lid 32 in a closed position as illustrated in FIG. 1, and operate the copy machine in an otherwise conventional manner. While this operation is normally executed in the absence of a document at the illumination station, it is foreseeable that a document of appropriate size and configuration may be present so long as such does not cover the machine usage data and other data desired to be copied. Such a document may comprise a business form or the like containing information related to the leasing company or its billing procedure.

It will be appreciated that the present invention is of relatively simple and inexpensive construction and utilizes the components of an otherwise conventional photographic reproduction apparatus. The exposure of the usage data is achieved through operation of the existing illumination station and its associated optical system. If an LED display or the like is utilized, exposure may be possible through the radiation of the LED alone and without energization of the illumination station.

It is not intended that the present invention be limited to the photographic reproduction apparatus illustrated in FIG. 1. The invention may be utilized with various other copy machines as will become apparent to those skilled in the art. Such machines may include different types of illumination stations and optical systems, such as those which provide exposure with documents in face-up orientation. It is also foreseeable that the counter or other display device may be positioned at locations other than that illustrated in FIG. 1–', so long as the focused image of the machine usage data is provided to the exposure station.

Figure 4:
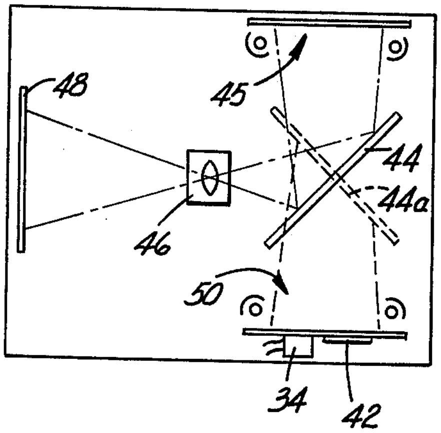
FIG. 4 is a diagrammatic illustration of an alternate embodiment of the present invention.

One such alternate embodiment is illustrated in FIG. 4 of the drawings. In this embodiment, the optical system includes a reflecting mirror 44 movable between a normal position shown in solid line and a data recording position 44*a* shown in dash line. When in the normal position, mirror 44 reflects a document image from document illumination station 45, through a lens system 46, to an exposure station image plane 48. Counter 34, and data member 42 are mounted at an auxiliary illumination station 50 remote from the document illumination station 45. In order to record the machine usage data, mirror 44 is moved to the position shown in dash line at 44*a* and the copy machine is operated in a mode which energizes illumination station 50. This provides an image of the usage data to exposure image plane 48, whereby the machine produces a copy of the data which may be utilized for billing purposes or the like.

From the foregoing description, it will be appreciated that the present invention provides a simple, yet highly versatile means for recording copy machine usage data. The present invention readily lends itself to use with any existing copy machines by making a minor modification to the machine whereby the usage data may be presented to the machine's optical system. Depending upon the nature and quality of the optical system the copies may be suitable for scanning with OCR equipment or the like. Since the usage data is copied directly from the counter or from a display associated with a counter, errors in recording the data are eliminated and the likelihood of fraud is significantly reduced.

Since the foregoing description and drawings are merely illustrative, the scope of protection of the invention has been more broadly stated in the following claims, which should be liberally interpreted so as to obtain the benefit of all equivalents to which the invention is fairly entitled.

I claim:

1. In an apparatus for producing copies of documents or the like and including illumination station means for irradiating documents to be copied, a device for recording data relating to the usage of the apparatus, said device comprising:

means operatively connected to said apparatus for producing visual data representative of the usage of the apparatus, and means for presenting an image of said visual data to said apparatus whereby said apparatus may produce a copy of said image, said image presenting means presenting said image to said illumination station means whereby a copy thereof may be produced, said illumination station means includes means for receiving a document for irradiation, said image presenting means being mounted in association with said receiving means, said receiving means including means for supporting a document in an object plane during irradiation and shielding means adjacent said support means for generally confining the radiation to the document, said image presenting means being carried by said shielding means for presenting said image to said object plane.

2. The device set forth in claim 1 wherein said visual data means is carried by said shielding means, said image presenting means being selectively operable to present an image of said visual data to said object plane.

3. The device set forth in claim 2 wherein said visual data means includes counter means advanceable in response to usage of the apparatus.

4. The device set forth in claim 1 wherein said apparatus includes exposure station means for receiving an image of a document to be copied, said image presenting means presenting said visual data image to said exposure station means.

5. In an apparatus for producing copies of documents presented to an illumination station, a structure for recording data relating to the usage of the apparatus, said structure comprising:

means operatively connected to said apparatus for producing a data representative of the usage of the apparatus, and means for selectively presenting an image of said data to the illumination station of the apparatus whereby operation of said apparatus produces a copy of said image, said illumination station including a single means for selective alternate illumination of a document or said image.

6. The structure set forth in claim 5 wherein said image presenting means includes means mounting said image producing means at the illumination station.

7. In an apparatus for producing copies of documents presented to a document imaging station of the apparatus, a structure for recording data relating to the usage of the apparatus, said structure comprising:

means operatively connected to said apparatus for providing an image representative of the usage of the apparatus adjacent the imaging station of the apparatus, and means for receiving a document to be copied, said document receiving means being disposed between the imaging station and said usage image providing means such that in the absence of a document the image of said image providing means is presented to the imaging station.

* * * * *